United States Patent
White et al.

(10) Patent No.: US 6,574,681 B1
(45) Date of Patent: Jun. 3, 2003

(54) NETWORK PLATFORM FOR FIELD DEVICES

(76) Inventors: H. Philip White, 42780 Santa Suzanne Pl., Temecula, CA (US) 92592; Carl L. Marcinik, 28551 Via Princesa, #B, Murietta, CA (US) 92563

( * ) Notice: Subject to any disclaimer, the term of this patent is extended or adjusted under 35 U.S.C. 154(b) by 0 days.

(21) Appl. No.: 09/422,927

(22) Filed: Oct. 21, 1999

(51) Int. Cl.[7] .............................................. G06F 13/14
(52) U.S. Cl. ........................ 710/15; 710/105; 702/188; 329/142.15; 370/352
(58) Field of Search .............. 710/105, 15; 379/142.15; 702/188; 370/352

(56) References Cited

U.S. PATENT DOCUMENTS

| | | | |
|---|---|---|---|
| 4,558,914 A | 12/1985 | Prager et al. ............. 339/75 R |
| 5,410,717 A | 4/1995 | Floro ......................... 395/800 |
| 5,479,618 A | 12/1995 | Van de Steeg et al. . 364/167.01 |
| 5,515,239 A | 5/1996 | Kamerman et al. ......... 361/727 |
| 5,530,643 A | 6/1996 | Hodorowski ................ 364/191 |
| 5,541,810 A | 7/1996 | Donhauser et al. ......... 361/686 |
| 5,544,008 A | 8/1996 | Dimmick et al. ........... 361/684 |
| 5,646,816 A | 7/1997 | Alden et al. ................ 361/622 |
| 5,682,476 A | * 10/1997 | Tapperson et al. ..... 395/200.05 |
| 5,777,874 A | 7/1998 | Flood et al. ................ 364/187 |
| 6,038,233 A | * 3/2000 | Hamamoto et al. ......... 370/401 |
| 6,278,706 B1 | * 8/2001 | Gibbs et al. ................ 370/352 |
| 6,393,014 B1 | * 5/2002 | Daly et al. .................. 370/352 |

* cited by examiner

Primary Examiner—Jeffrey Gaffin
Assistant Examiner—Abdelmoniem Elamin (57) ABSTRACT

The present invention comprises a network platform that couples field devices to a TCP-IP based enterprise network having a control engine containing control logic for monitoring and controlling the field devices. In one embodiment, the network platform couples the field devices to the enterprise network through a network switch. Signals flowing through the network switch to and from the field devices may be assigned varying levels of priority wherein the network switch resolves resource conflicts by granting priority to the signal possessing the highest priority. Alternatively, signals flowing through the network switch to and from the field devices may be classified according to the type of signal transmission and the network switch reserves a portion of switch resources exclusively for certain types of signals.

7 Claims, 6 Drawing Sheets

NETWORK PLATFORM FOR FIELD DEVICES

This application relates generally to the coupling of field devices to a network and more particularly to the coupling of field devices through a network platform to control logic located within the network.

BACKGROUND OF THE INVENTION

Field devices such as thermocouples, sensors, motor starters, valves and others have special needs not typically addressed by the commercial networking industry. These needs include industrial hardening (the factory floor is often a much harsher environment than that of the typical office), linear connection topology requirements, cost sensitivity (cost per point for an Signal interface (I/O) device connection is important), and packaging issues (e.g., NEMA enclosures or various agency approvals create radically different packaging and power requirements than office devices). As a result of the specialized requirements for such field devices, vendors have created a plethora of pseudo-standard networks, including DeviceNet™, Profibus™, and ASI and FieldBus™ to couple field devices to controlling logic contained within, e.g., programmable logic controller (PLC) processors, or other industrial controllers. Such networks form the I/O and Device Network layer of industrial control networks. Field devices may be denoted as either "smart" devices if they can directly access the network layer or "dumb" if they require an intermediate I/O system to access the network layer.

Above the I/O and Device Network layer, the PLC processors, industrial controllers and other intelligent devices containing controlling logic are coupled to a control network. This network, which functions as the Control and Information Network layer and accommodates peer-to-peer messaging, PLC processor interlocking and other functions, is also pseudo-standard. The relationship of the pseudo-standard device and control layers to an enterprise LAN in prior art control systems is illustrated in FIG. 1.

Figure 1:
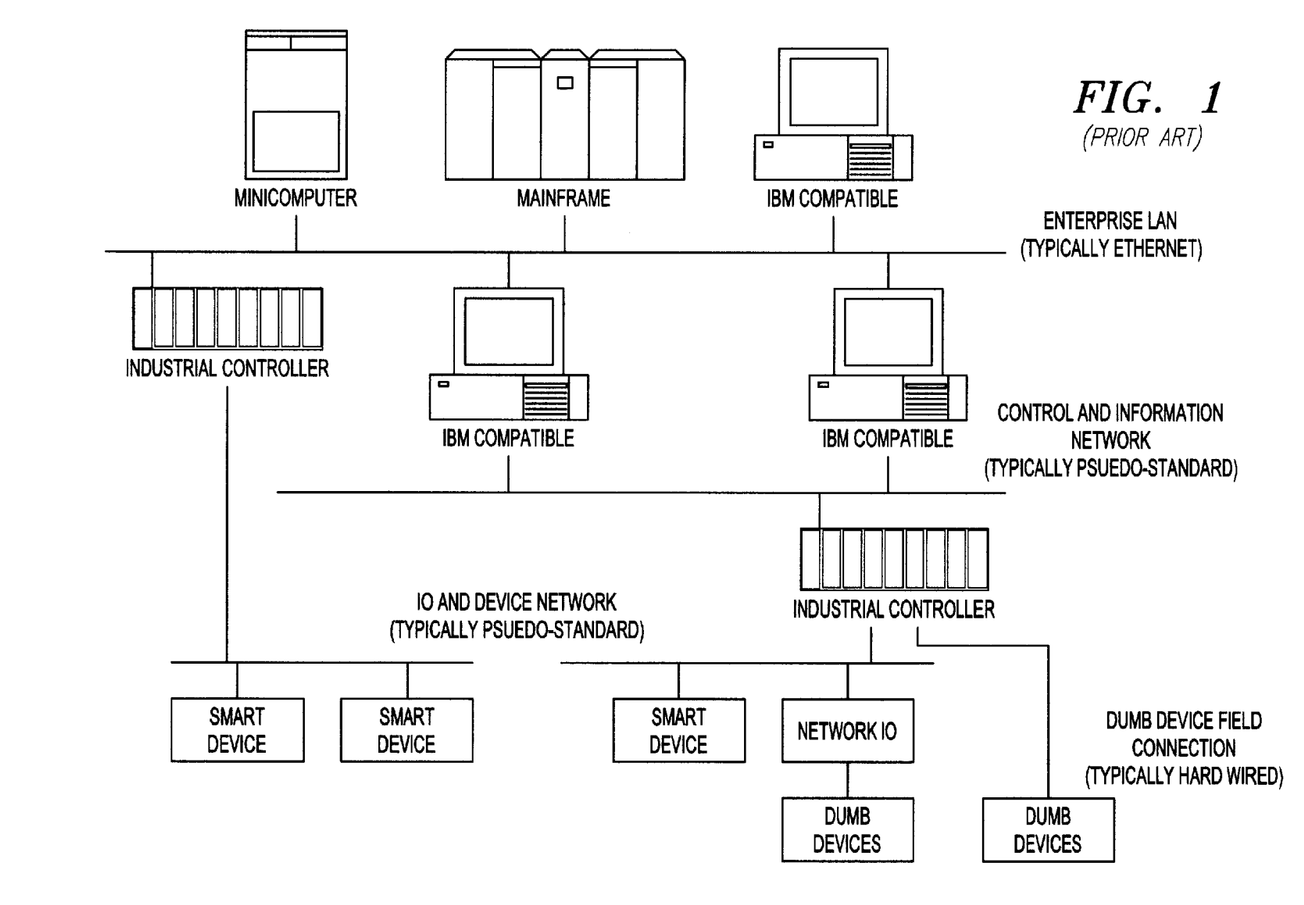
FIG. 1 illustrates a typical prior art control system architecture.

Upon inspection of FIG. 1, it will be noted that existing control systems utilize a gateway approach to physically segment traffic in the control and monitoring system. In the prior art system illustrated, these gateways take the form of the Industrial Controller and the IBM Compatible PCs. Newton's Telecom Dictionary defines a gateway as follows:

Typically referred to as a node on a network that connects to otherwise incompatible networks . . . Thus, gateways on data networks often perform data and protocol conversion processes . . . According to the OSI model, a gateway provides a mapping of all seven layers of the model.

Gateways are needed because devices on the (typically IP based) Enterprise LAN cannot communicate directly with devices on the incompatible pseudo-standard control network. This gateway approach of prior art control systems has historically been done for a number of reasons including the previously described specialized requirements of field devices.

Another reason is the time critical nature of I/O and Device traffic. To guarantee that the field devices would have unobstructed access to interact with essential control logic, the I/O and Device level traffic was physically segmented from higher level network traffic. Thus, the control engine had direct access to the I/O and Device traffic through a dedicated connection, e.g., an Allen-Bradley PLC5 Industrial Controller's control engine can communicate with I/O modules directly via its proprietary backplane. Similarly, a DeviceNet™ interface card can be plugged in and the control engine can communicate with smart devices. Such a controller may be connected to another higher level network like ControlNet™ or Ethernet, but peers on the network can only access the controller's I/O information by going "through" the controller's control engine. In this fashion, the control engine is the gateway; any interaction with the I/O by a peer node on the higher level network is constrained by the controller's engine.

But the gateways in prior art control systems create a number of problems. For example, gateways are tremendously inefficient and side effect ridden. They also require applications to be target network specific. For instance, an application must still be written for "DeviceNet™" although it might be connected only to "Ethernet" because it will be communicating with an Ethernet to DeviceNet™ gateway, which is essentially an encapsulation of DeviceNet™ protocol on the Ethernet link. In addition, there are always some issues and incompatibilities involved with writing an application that communicates directly with the target network vs. an application that communicates with a target network through a gateway. Thus, there is a need in the art for a new kind of control system which will be open at all levels and obviate the need for a gateway.

SUMMARY OF THE INVENTION

The present invention provides a network platform that allows industrial field devices such as thermocouples, sensors, motor starters, valves and the like to directly communicate with an IP-based enterprise network, thereby producing an open control system. The field devices may produce either an analog or a digital output signal for transmission to the network platform. In turn, the network platform may transmit either an analog or a digital input signal to the field devices. Devices on the IP-based enterprise network may communicate directly with the field devices through the network platform. In particular, control logic, which resides on the enterprise network, may interact with the field devices through the network platform.

The resulting control system comprising the IP-based enterprise network, the network platform and the field devices is open in that the network platform follows the IP-based protocol of the enterprise network. Thus, the field devices are essentially equal peers with the remaining devices on the enterprise network. In a preferred embodiment, the network platform prioritizes traffic so that a Quality of Service (QoS) may be guaranteed for a particular class of traffic. A network switch or other form of arbitrator within the network platform distinguishes between the various classes of traffic, giving priority according to the criticality of the traffic class.

The network platform may comprise a backplane for providing communication, power and field connections for other components within the network platform. Signal interface modules coupled to the backplane provide the translation of signals between the field devices into a form suitable for transmission on the backplane. The backplane couples the translated signals to a device module that functions to convert the translated signals into IP-based signals that other participants on the IP-based network will recognize. A network switch or other form of arbitrator couples between the IP-based network and the converted IP-based signals to increase the available bandwidth between the field devices and other peers on the IP-based network.

DETAILED DESCRIPTION

Figure 2:
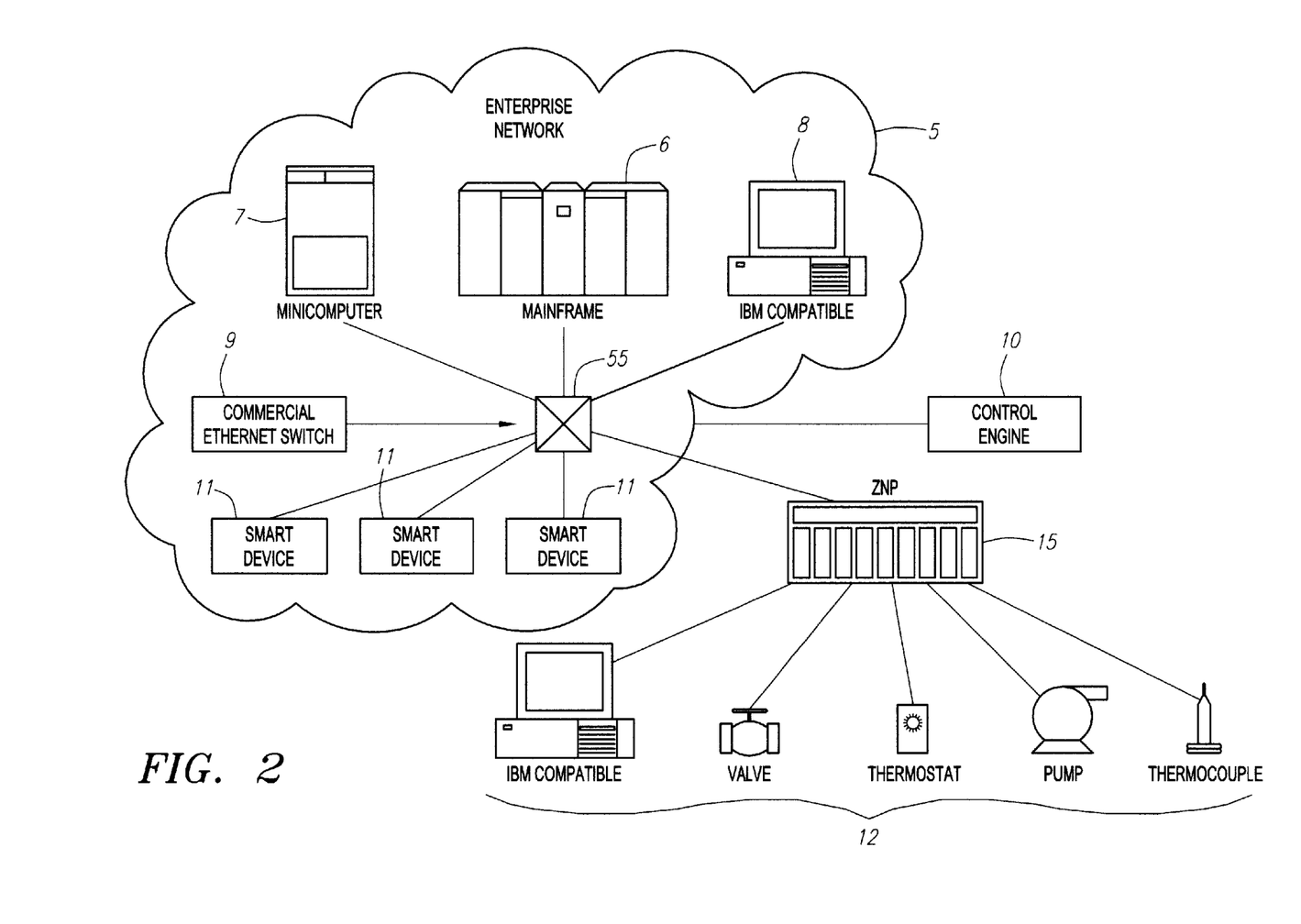
FIG. 2 illustrates a control system architecture according to one embodiment of the invention.

Turning to the figures, in one innovative aspect the present invention is directed to the implementation of a network platform for field devices. As shown in FIG. 2, an enterprise network 5 connects various devices such as a mainframe 6, a minicomputer 7 and a PC 8. "Smart" field devices 11, which can directly access the network, interact with a control engine 10. The control engine comprises logic that controls the field devices 11 and may reside anywhere on the network such as on the mainframe or other suitable device and may reside in software, hardware or a combination of software and hardware. As used herein, "field device" refers to industrial devices such as thermocouples, sensors, motor starters, valves, security cameras and other devices that produce either an analog or a digital output signal. The control engine monitors the output signals and generates control signals in response. These control signals in turn may cause either digital or analog input signals to be generated for transmission to the field devices.

A network platform 15 permits additional field devices 12 to connect to the enterprise network 5. The enterprise network can be any suitable Internet Protocol (IP) based network including Ethernet or DSL based LANs, or a global information network such as the Internet. In the embodiment illustrated in FIG. 2, the enterprise network 5 is an Ethernet LAN including a commercial Ethernet switch 9. The network platform 15 permits the field devices 12 (which can be either "smart" or "dumb" devices) to transparently access the enterprise network 5 as peers with other network connected devices such as the mainframe 6, minicomputer 7 and the other network connected devices of the enterprise network 5.

It is to be noted that a typical IP-based enterprise network has many services available such as file service through network connected file servers, printing service through network connected printers, database servers through network connected databases, Internet services through network connected routers, Phone services through Voice over IP and numerous other services. In the prior art control system illustrated in FIG. 1, field devices connected to the I/O and Device Network could interact with these services only through the gateways provided by the Industrial Controllers and PCs, an interaction hampered by the inefficiencies and incompatibilities inherent in any gateway. The field devices were merely isolated "slave" subordinate devices on the network. Because the network platform 15 obviates the need for a pseudo-standard device or control network, the monitoring and control functions provided by the control engine 10 becomes just another service available on the enterprise network 5, without compromising the advantages offered by prior art control systems. In addition, the field devices themselves become just another set of services on the network and are not isolated by a controller as in prior art systems. The field devices thus become peers on the enterprise network 5.

Figure 3:
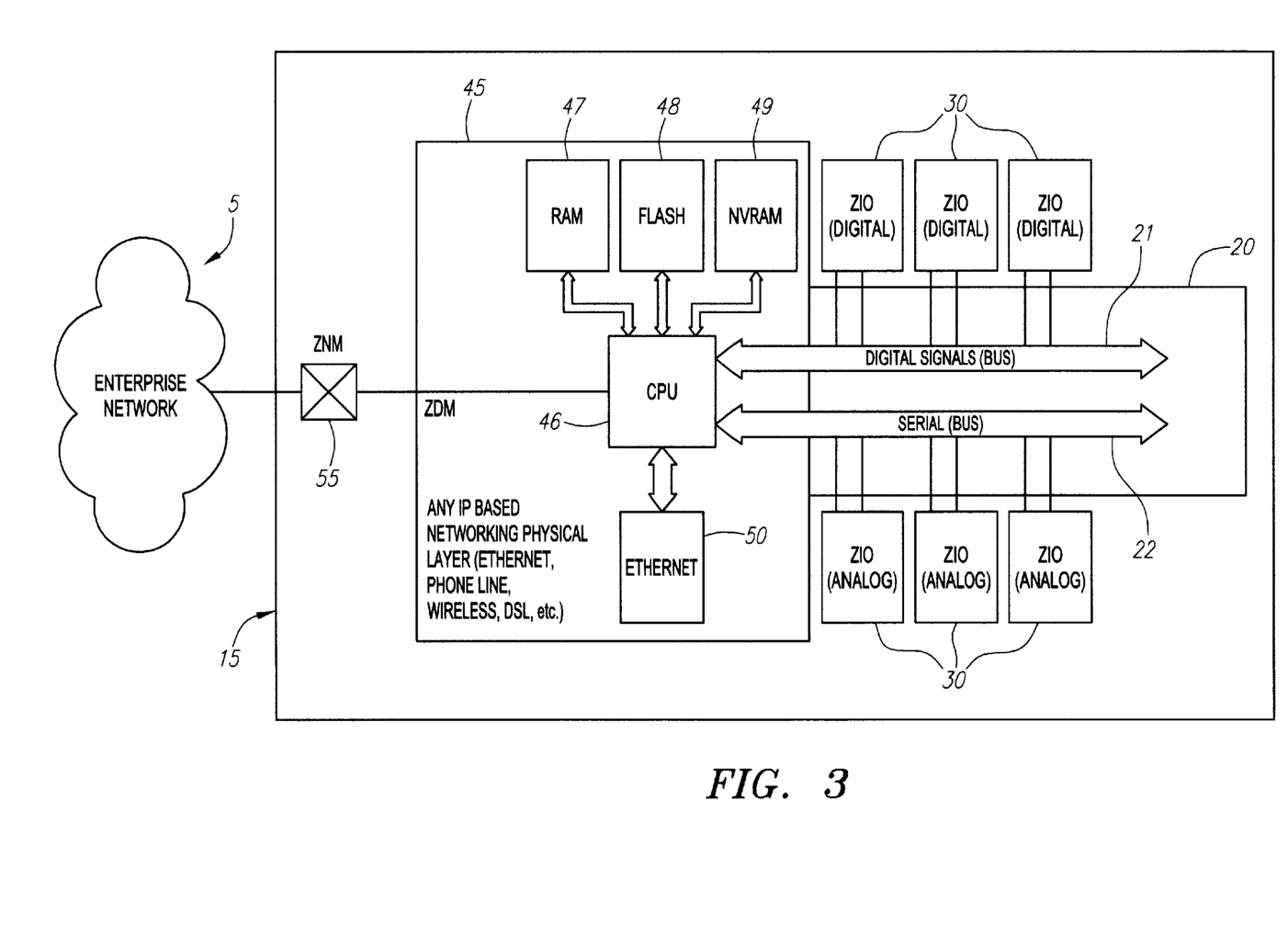
FIG. 3 is a block diagram for a network platform for field devices according to one embodiment of the invention.

Referring now to FIG. 3, a block diagram for a network platform 15 is illustrated. In this embodiment, the network platform comprises 4 main components: a backplane 20, Signal interface modules 30, a device module 45, and an optional network switch 55. These components may be discrete or may be integrated into a single board or integrated circuit. The backplane provides power, communication, and field connections for the other network platform components. As will be appreciated by one of ordinary skill in the art, the backplane 20 is customized according to the field connections required by a particular application. This includes the connections necessary for the signal interface modules 30 which provide the translation of signals from the field devices (illustrated in FIG. 2) to a representation that other participants in the device module 45 can understand. The device module 45 takes the raw data from the signal interface modules 30 and converts it into an IP-based packet for transmission to participants in the enterprise network 5. The present invention includes a number of different configurations for the device module 45, which may be tailorable for the particular requirements of a given signal interface module 30. Alternatively, the device module 45 may be in a set I/O configuration or block configuration.

Within the device module 45, a CPU 46 may be associated with memory modules such as RAM 47, Flash memory 48 or NVRAM 49. The CPU includes a rule set 50 which provides the medium access control instructions for converting signals received from the signal interface modules 30 (via the backplane 20) into an IP-based format for transmission to the enterprise network 5. In one embodiment, the CPU 46 runs object oriented software including an object request broker to monitor field device objects. Optionally, a network switch 55 or other type of network arbitrator couples signals from the network platform to the enterprise network 5. The network switch 55 may be a custom switch or merely a commercial network switch such as an Ethernet switch supplied with the enterprise network (illustrated in FIG. 2).

Figure 4A:
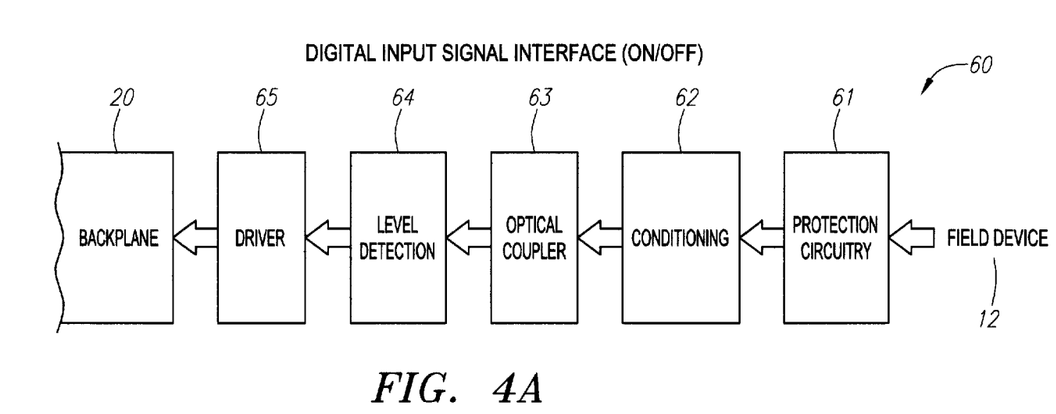
FIG. 4a is a block diagram for a digital input signal interface for the network platform according to one embodiment of the invention.

It is to be noted that the signal interface modules 30 may be separated into 5 major classes: Digital Input, Digital Output, Analog Input, and Analog Output and Serial. Referring now to FIGS. 4a through 4e, these classes of signal interface modules 30 are illustrated. A Digital Input signal interface 60 couples digital input signals produced by a field device 12 to the backplane 20 as illustrated in FIG. 4a. The interface 60 may comprise protection circuitry 61 which blocks any voltage or current spikes produced by the field device. After passing through the protection circuitry 61, the digital input signal is conditioned by conditioning circuitry 62 which may provide hysteresis or filtering functions as necessary for a given digital input signal. An optoisolator provides ground isolation between the backplane 20 and the field device 12. Level detection circuitry 64 and driver circuitry 65 provide the appropriate digital representation so that the digital input signal may be transmitted by the backplane 20. Referring back to FIG. 3, the backplane 20 may include a digital signal bus 21, which may be either a parallel or serial bus, to carry the digital input signal to the device module 45.

Figure 4B:
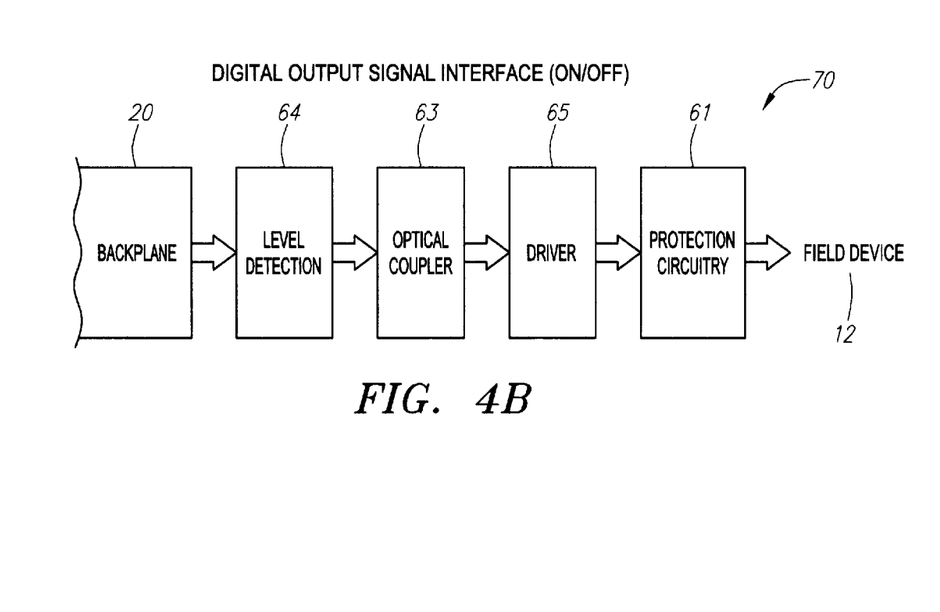
FIG. 4b is a block diagram for a digital output signal interface for the network platform according to one embodiment of the invention.

In turn, the control engine (illustrated in FIG. 2) or other devices connected to the enterprise network may cause a digital output signal to be transmitted from the device module 45 through the digital signal bus 21 and a Digital Output signal interface module 70 to couple the digital output signal to a field device 12 as illustrated in FIG. 4b. Level detection circuitry 64, driver circuitry 65, optoisolator 63, and protection circuitry 61 function analogously as in the Digital Input signal interface module 60 so as to provide the appropriate digital representation, isolate the grounds, and protect the field device 12 from voltage or current spikes. Thus, Digital Input signal interface module 60 and Digital Output signal interface module 70 collectively are signal interface modules 30 adapted to couple digital signals between field devices and the device module 45 via the digital signal bus 21 in the backplane 20.

Figure 4C:
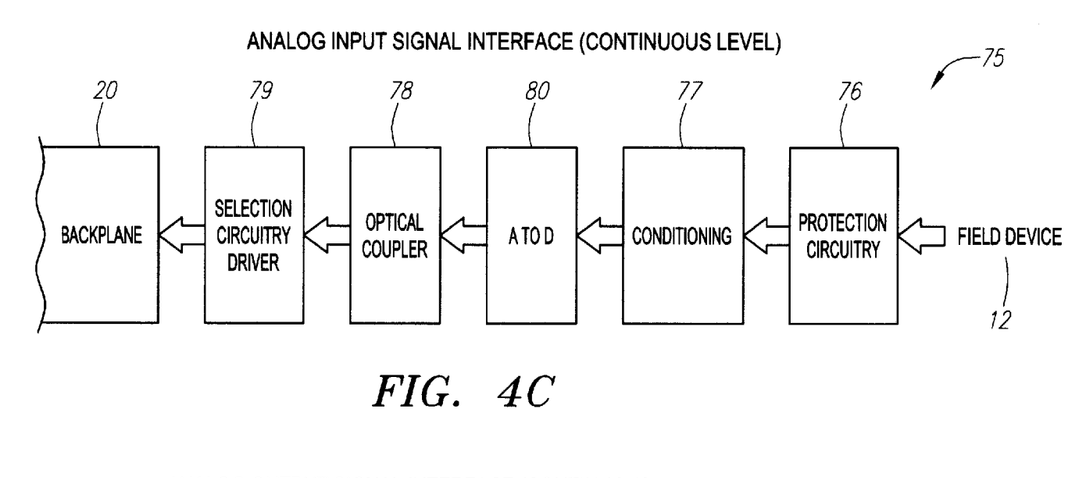
FIG. 4c is a block diagram for an analog input signal interface for the network platform according to one embodiment of the invention.

Signal interface modules 30 also may be adapted to couple field devices producing analog signals to the backplane 20. An Analog Input signal interface module 75 that accepts an analog input signal from a field device, digitizes the signal, and couples the digitized analog signal to the backplane 20 as illustrated in FIG. 4c. The field device 12 produces an analog input signal that passes through protection circuitry 76 and conditioning circuitry 77 performing analogous functions to those described with respect to the digital input and output signal interface modules. After being conditioned, the analog input signal is digitized in the analog to digital (A/D) converter 80. Selection circuitry driver 79 drives the digitized analog input signal onto a serial bus 22 within the backplane 20. In addition, an optoisolator 78 isolates the grounds of the serial bus 22 and the Analog Input signal interface module 75.

Figure 4D:
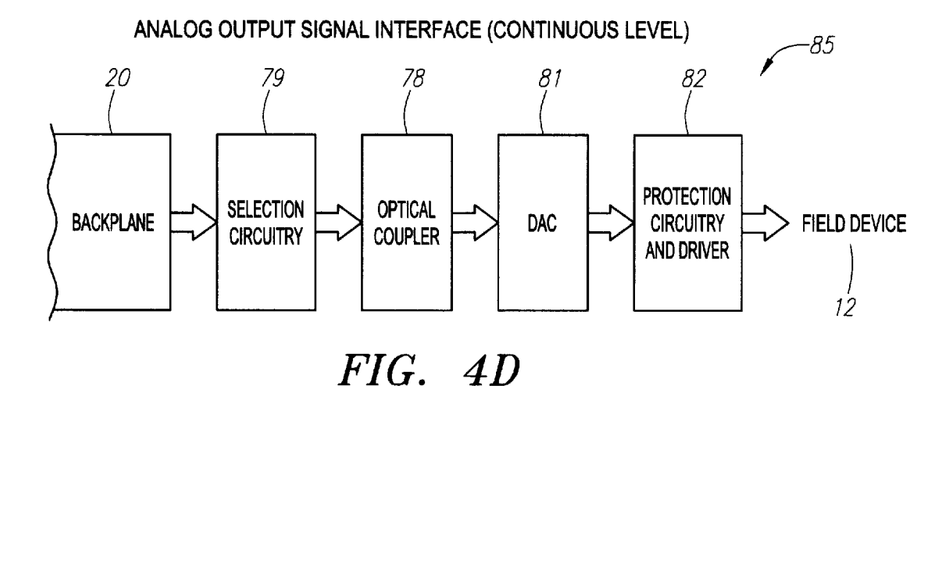
FIG. 4d is a block diagram for an analog output signal interface for the network platform according to one embodiment of the invention.

Similarly as described for the Digital Output signal interface module 70, the control engine or other devices connected to the enterprise network may cause an analog output signal to be sent to a field device capable of responding to an analog signal. At the backplane, the analog output signal is present as a digitized analog output signal on the serial bus. An Analog Output signal interface module 85 accepts the digitized analog output signal from the serial bus 22 in the backplane 20 for coupling to the field device 12 as illustrated in FIG. 4d. The digitized analog output signal passes through selection circuitry 79 and optoisolator 78 that function analogously to the selection circuitry and optoisolator as described with respect to FIG. 4c. A digital to analog converter (DAC) 81 converts the digitized analog output signal into an analog output signal that is coupled to the field device 12 through protection circuitry and driver circuitry 82.

Figure 4E:
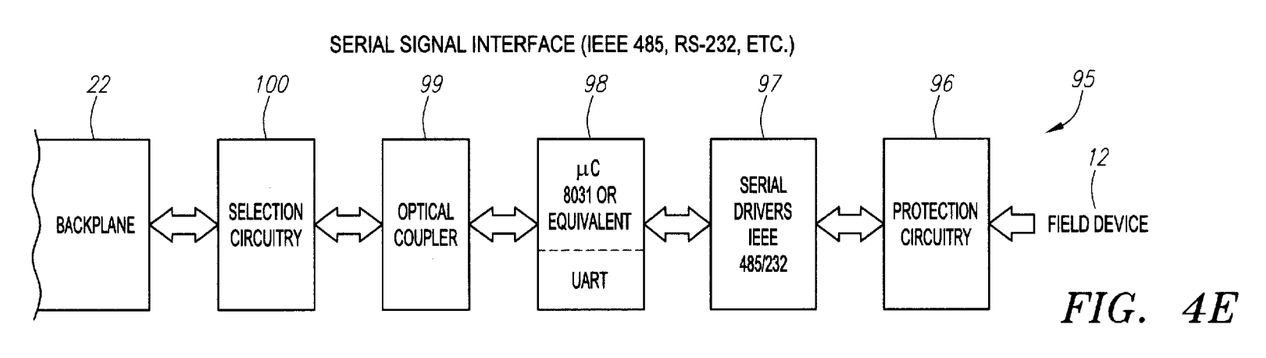
FIG. 4e is a block diagram for a serial signal interface for the network platform according to one embodiment of the invention.

Signal interface modules 30 may also be adapted to couple field devices through a serial communication link such as an RS-232 link. A serial signal interface module 95 that accepts an input signal from a field device and couples the input signal through a serial communication link to the backplane 20 is illustrated in FIG. 4e. In addition, the serial signal interface module 95 accepts output signals from the backplane 20 and couples the output signals through the serial communication link to the field device. The field device 12 produces an input signal that passes through protection circuitry 96 into a serial driver 97. Serial driver 97 drives input and output signals between a UART 98 (which may be a μC 8031 or equivalent) and the protection circuitry 96 according to the serial communication protocol being implemented, which may be an RS-232 or an RS-485 protocol. Serial input and output signals couple between a serial bus 22 within the backplane 20 and the UART 98 through selection circuitry driver 100. In addition, an optoisolator 99 isolates the grounds of the serial bus 22 and the serial signal interface module 95. One of ordinary skill in the art will appreciate that the various elements illustrated in the embodiments of the interface modules of FIGS. 4a through 4e may be altered as appropriate to couple a given field device to the backplane. For example, the protection circuitry could consist of conventional back-to-back diodes arranged in parallel or GaAs switches could be implemented. The A/D and D/A functions could be performed strictly in hardware or in a combination of hardware and software. Other types of isolation devices may be used in lieu of optoisolators. These and other modifications are well within the state of the art.

The components of the network platform such as the backplane, signal interface modules, device module and the network switch allow field devices to interact with control logic and other devices in an enterprise network without the need for gateways as in the prior art system of FIG. 1. One reason, however, for using the prior art control system of FIG. 1 is that the time critical nature of signal traffic for field devices. Often in industrial processes, a field device such as a valve or motor must be able to respond quickly to control commands. In the I/O and Device Network of FIG. 1, the field devices may have a dedicated connection with the control engine within the Industrial Controllers, insuring a certain bandwidth is available at all times.

Such a Quality of Service (QoS) is also provided by the present invention. The network switch 55 may provide the QoS in a number of ways. These ways may be contrasted with traditional network switch operation. A traditional network switch such as an Ethernet switch is designed to connect Ethernet enabled devices together. The switch does little to get involved in the actual communication between devices (although it will do some transparent traffic discrimination resulting in better network utilization and efficiency). Such switches are a platform used to facilitate TCP-IP based communications to devices connected through a variety of communication media including unshielded twisted pair or fiber optic cable. The present invention expands the platform concept to include connection points for industrial field devices. Thus, the present invention integrates industrial field devices into the corporate enterprise TCP-IP infrastructure. Although this can be accomplished using a conventional network switch to couple the device module of the network platform to the enterprise network, it may be important to maintain the integrity of time-critical data by ensuring a certain level of QoS.

In one embodiment of the present invention, the data being sent through the switching fabric of the network switch is assigned different levels of time critical requirements. These different levels are mapped into different levels of QoS. This mapping may be done in a variety of ways. In a typical control system, not all the traffic is going to be time critical, or at the very least there will be different levels of time critical requirements. The mapping would be made accordingly. For example, the highest priority of data (or traffic) may be assigned to emergency events. The next highest priority may be data relating to motion control such as servo or stepper traffic, followed by field signal data, then streaming data such as voice or video. The lowest priority (default) would be assigned to the remainder of the data. The priority level may be included with data by use of a header to a data packet (type of service field in IP packet). The switching fabric of the network switch, if presented with conflicting data, would switch according to the level of priority, typically accomplished by means of a queuing algorithm.

In another embodiment of the invention, the network switch would pre-allocate network resources between endpoints, so that when the communication occurs the resources are available (reserved) for the communication to take place at the requested service level. Thus, the network switch could reserve a certain bandwidth for a given class of time critical data. Thus, unlike the priority scheme just described, in this embodiment, if the given class of time critical data is not being presently transmitted, the network switch does not utilize the reserved bandwidth. Despite these differences, both embodiments, however, follow the current Internet Engineering Task Force work on Integrated Services, Differentiated Services and ReSerVation Protocol (RSVP). In addition, both embodiments support the IEEE 802.1 standard.

Figure 5:
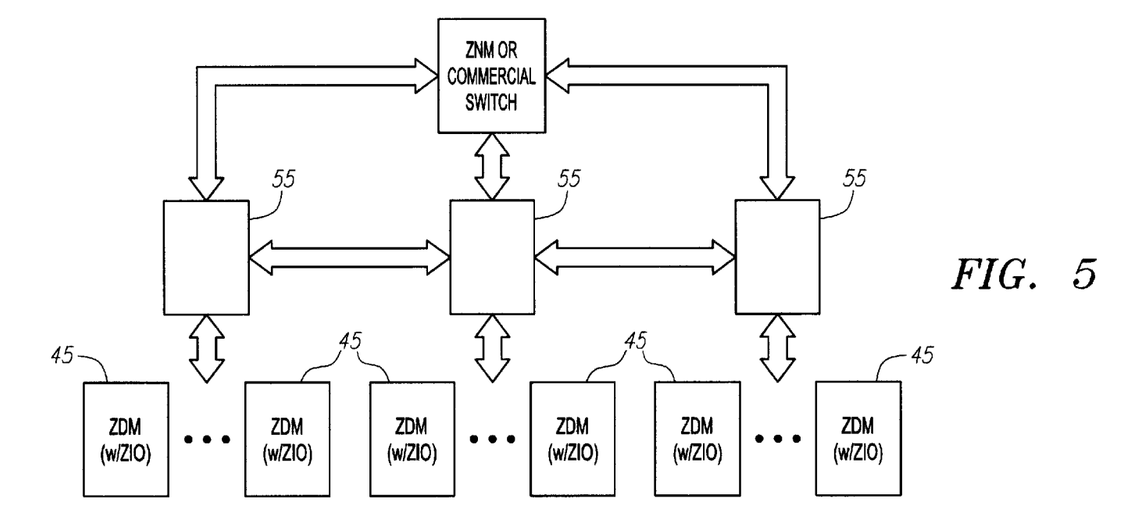
FIG. 5 is a block diagram of a control system according to the present invention wherein multiple network switches couple a plurality of device modules to an enterprise network.

Regardless of whether or not the network switch provides QoS, the network switch may be coupled in various topologies so that multiple device modules (with their backplanes and I/O modules) may be coupled into the enterprise network. The network switches so coupled act like a single large network switch, thus minimizing inter-network switch latencies. For example, FIG. 5 illustrates three network switches 55 coupling a plurality of device modules 45 to control logic and other devices in the enterprise network (not illustrated), which devices would also couple to the network switches as illustrated in the manner illustrated in FIG. 2. In one embodiment, each network switch may act as an unmanaged switch (10/100 mbs), a managed switch (10/100 mbs), a managed switch with QoS (10/100 mbs), an unmanaged hub (single collision domain, 10/100 mbs), or a managed hub (single collision domain, 10/100 mbs). The coupling of these switches may form a hierarchy, but this is only a hierarchy of "available bandwidth" and does not diminish the peer role of field devices in the present invention. The hierarchy of these switches is equivalent to what is common in enterprise LAN design today.

While those of ordinary skill in the art will appreciate that this invention is amenable to various modifications and alternative embodiments, specific examples thereof have been shown by way of example in the drawings and are herein described in detail. It is to be understood, however, that the invention is not to be limited to the particular forms or methods disclosed, but to the contrary, the invention is to broadly cover all modifications, equivalents, and alternatives encompassed by the spirit and scope of the appended claims.

We claim:

1. A control system comprising:
   an IP based enterprise network for networking network devices wherein at least one network device contains a control engine having control logic for controlling and monitoring field devices; and
   a network platform having a CPU and a network arbitrator for coupling signals between the CPU and the network devices, the CPU configured to receive input signals from the field devices and translate the input signals into an IP based representation for transmission to the enterprise network for interaction with the control engine and to receive IP based output signals from the control engine and translate them into output signals for transmission to the field devices, the network arbitrator comprising a network switch,
   wherein the input signals from the field devices and the output signals for transmission to the field devices are classified into a plurality of data packet priority levels and wherein the network switch resolves a resource conflict among the input and output signals within the network switch by monitoring the priority levels and granting priority to a signal whose priority level is higher than the priority level of a conflicting signal.

2. The control system of claim 1 wherein the input signals from the field devices and the output signals for transmission to the field devices are classified according to a plurality of types of signal transmission and wherein the network switch reserves switch resources exclusively for at least one type of signal transmission.

3. The control system of claim 1 wherein the network platform further comprises:
   a backplane having at least one bus wherein the at least one bus couples to the CPU; and
   a signal interface module coupled to the at least one bus and to a field device wherein the signal interface module possesses protection circuitry for protecting the at least one bus from voltage spikes produced by the coupled field device and isolation circuitry for isolating a grounds of the at least one bus and a ground of the coupled field device.

4. The control system of claim 3 wherein the coupled field device produces an analog input signal, and wherein the signal interface module further comprises an analog to digital converter for converting the analog input signal to a digitized analog input signal, and wherein the at least one bus is a serial bus.

5. The control system of claim 3 wherein the at least one bus is a serial bus, the signal interface module further comprising a digital to analog converter for converting a digitized analog output signal received on the serial bus to an analog output signal, and wherein the coupled field device receives the analog output signal.

6. The control system of claim 3 wherein the at least one bus is a parallel bus, and the coupled field device produces a digital input signal, the signal interface module further comprising driver circuitry for driving the digital input signal onto the parallel bus.

7. The control system of claim 3 wherein the at least one bus is a parallel bus, the signal interface module further comprising driver circuitry for driving a received digital output signal carried on the parallel bus to the coupled field device.

* * * * *